(12) United States Patent
Tone

(10) Patent No.: US 11,886,101 B2
(45) Date of Patent: Jan. 30, 2024

(54) DISPLAY DEVICE, AND METHOD OF CONTROLLING DISPLAY DEVICE

(71) Applicant: SEIKO EPSON CORPORATION, Tokyo (JP)

(72) Inventor: Takehiko Tone, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 368 days.

(21) Appl. No.: 17/128,415

(22) Filed: Dec. 21, 2020

(65) Prior Publication Data

US 2021/0191237 A1 Jun. 24, 2021

(30) Foreign Application Priority Data

Dec. 23, 2019 (JP) ................................. 2019-231180

(51) Int. Cl.
*G03B 21/00* (2006.01)
*H04N 9/31* (2006.01)
*H04N 25/771* (2023.01)

(52) U.S. Cl.
CPC ......... *G03B 21/006* (2013.01); *H04N 9/3147* (2013.01); *H04N 25/771* (2023.01)

(58) Field of Classification Search
CPC .. H04N 9/3141; H04N 9/3147; H04N 9/3155; G06F 12/0238; G06F 12/0646; G03B 21/006; G03B 21/008; G03B 21/28; G03B 21/145; G03B 21/206
See application file for complete search history.

(56) References Cited

U.S. PATENT DOCUMENTS

| | | | |
|---|---|---|---|
| 8,860,890 B2* | 10/2014 | Jang ....................... | G06F 1/3265 348/730 |
| 8,931,907 B2* | 1/2015 | Ueno .................... | H04N 9/3194 353/122 |
| 9,128,358 B2* | 9/2015 | Kubota .................. | G03B 21/14 |
| 2015/0253834 A1 | 9/2015 | Park | |
| 2016/0150472 A1* | 5/2016 | Yoon ..................... | G06F 1/3293 455/574 |
| 2016/0284385 A1* | 9/2016 | Nomura ................ | G06F 1/3284 |
| 2019/0014301 A1 | 1/2019 | Ota | |
| 2020/0183704 A1 | 6/2020 | Lai et al. | |

FOREIGN PATENT DOCUMENTS

| | | |
|---|---|---|
| CN | 106104416 A | 11/2016 |
| CN | 109426525 A | 3/2019 |
| JP | 2006-221381 | 8/2006 |
| JP | 2009-181179 | 8/2009 |
| JP | 2013-007974 A | 1/2013 |
| JP | 2013-156700 A | 8/2013 |
| JP | 2014-041364 | 3/2014 |
| JP | 2018-155974 A | 10/2018 |
| JP | 2019-016161 | 1/2019 |

\* cited by examiner

*Primary Examiner* — Sultan Chowdhury
(74) *Attorney, Agent, or Firm* — Dority & Manning, P.A.

(57) ABSTRACT

A projector is provided with a CPU, a first memory which is a volatile memory to be reset when the projector makes the transition to a standby state, and a second memory which is a volatile memory capable of keeping data in the standby state of the projector. The CPU stores OSD data in the second memory when the projector makes the transition to the standby state.

7 Claims, 4 Drawing Sheets

DISPLAY DEVICE, AND METHOD OF CONTROLLING DISPLAY DEVICE

The present application is based on, and claims priority from JP Application Serial Number 2019-231180, filed Dec. 23, 2019, the disclosure of which is hereby incorporated by reference herein in its entirety.

BACKGROUND

1. Technical Field

The present disclosure relates to a display device and a method of controlling a display device.

2. Related Art

In the past, there has been known a display device which makes the transition to a standby state of temporarily stopping the operation of a light source and so on, and then returns from the standby state in accordance with signal input or the like from an external device (see, e.g., JP-A-2014-041364 (Document 1)). The projector described in Document 1 puts the light source on, and then displays an image for standby when returning from the standby state.

In general, the display device stores in advance data of an image to be displayed in accordance with the operation of the display device. The data of this kind is stored in the nonvolatile storage device so that the memory is kept during the period in which the energization is stopped in the standby state. However, it takes time to retrieve data from the nonvolatile storage device compared to a volatile storage device. Therefore, there is a problem that it takes time until it becomes possible to display an image when returning from the standby state.

SUMMARY

An aspect for solving the problem described above is directed to a display device including a display section, a processor configured to control the display section, a first memory which is a volatile memory to be reset when the display device makes a transition to a standby state, and a second memory which is a volatile memory configured to keep data in the standby state of the display device, wherein the processor stores data of a display object in the second memory when the display device makes the transition to the standby state, and the data of the display object is displayed in the display section when returning from the standby state to a normal operation state.

Another aspect for solving the problem described above is directed to a method of controlling a display device equipped with a display section, the method including the steps of controlling storage of data in a first memory which is a volatile memory to be reset when the display device makes a transition to a standby state, and a second memory which is a volatile memory configured to keep data in the standby state of the display device, and storing data of a display object in the second memory when the display device makes the transition to the standby state, wherein the data of the display object is displayed in the display section when returning from the standby state to a normal operation state.

DESCRIPTION OF EXEMPLARY EMBODIMENTS

1. Configuration of Projector

Figure 1:
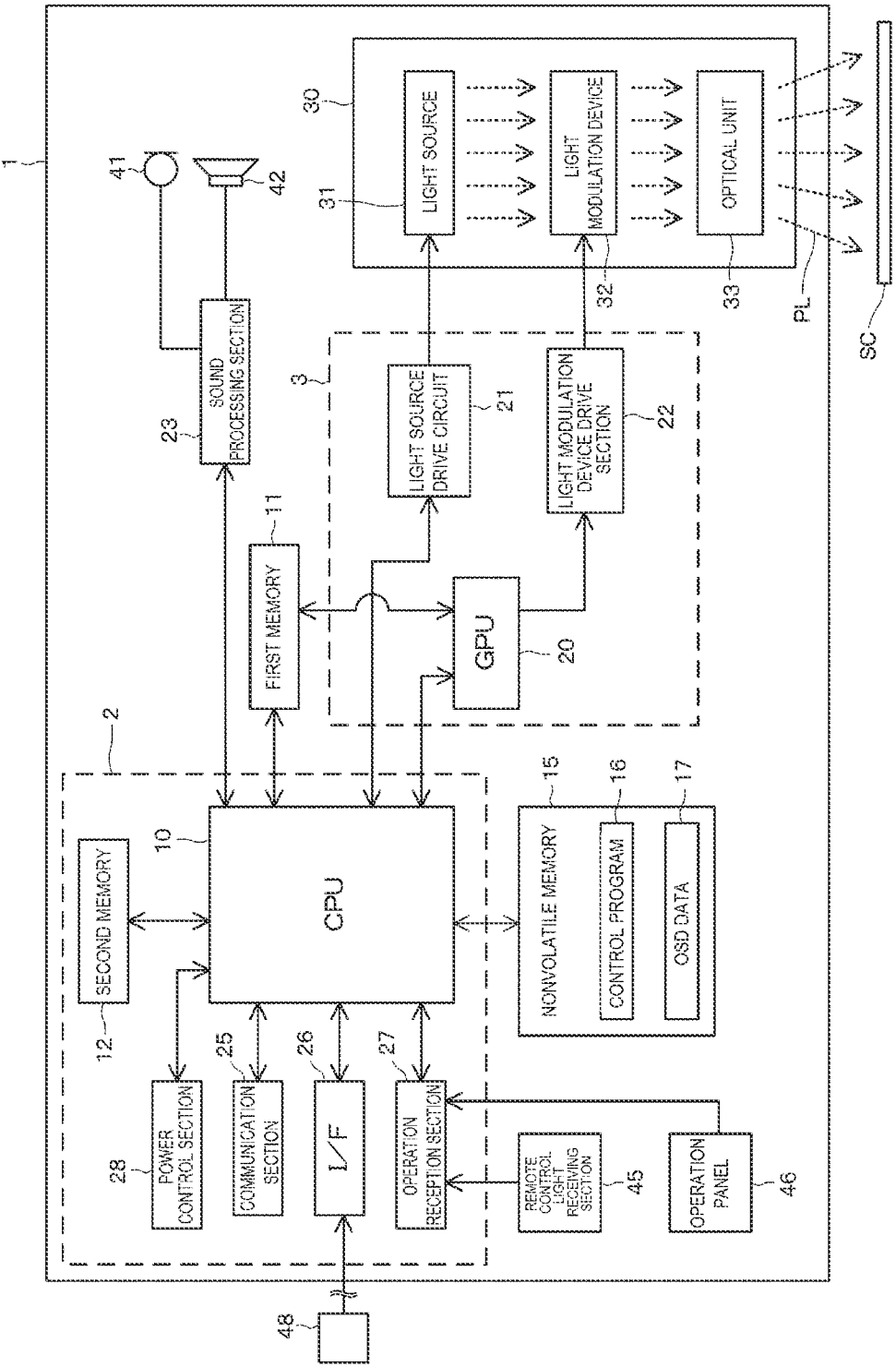
FIG. 1 is a block diagram of a projector.

FIG. 1 is a block diagram of a projector 1 according to an embodiment implementing the present disclosure.

The projector 1 projects image light PL to a screen SC based on the image data supplied from an image supply device not shown to be externally connected, or the image data stored by a nonvolatile memory 15 to form the image on the screen SC. The projector 1 corresponds to an example of a display device, and the operation of the projector 1 forming the image on the screen SC corresponds to display.

An installation state of the projector 1 and an object to which the projector 1 projects the image light PL are arbitrary, and in the present embodiment, the description will be presented citing a configuration of projecting the image light PL to the screen SC as an example. It is possible for the projector 1 to project a still image based on still image data, or to project a moving image based on video data. Further, the image to be projected by the projector 1 can be a two-dimensional image, or can also be a three-dimensional image. Including these images, the image to be projected by the projector 1 is called a projection image.

The processor 1 has a control section which executes a program to control each section of the projector 1. This control section is provided with a processor for executing the program, and realizes the control function due to cooperation between hardware and software. In the present embodiment, there is shown an example provided with a CPU 10 as the processor.

To the CPU 10, there are connected a first memory 11, a second memory 12, and the nonvolatile memory 15. The first memory 11 and the second memory 12 are each a volatile storage device formed of a DRAM or the like, and therefore, require supply of the power for keeping the memory state, and are reset by the CPU 10 when the power supply is stopped. For example, when making the transition to the standby state described later, the power supply to the first memory 11 is stopped, and thus, the first memory 11 is reset. The first memory 11 and the second memory 12 form the work area when the CPU 10 executes the program. Further, a part of the storage area of the first memory 11 functions as a frame memory for a GPU 20 described later to develop the image data.

The nonvolatile memory 15 is a nonvolatile storage device such as a flash ROM or an EEPROM. The nonvolatile memory 15 stores the program to be executed by the CPU 10 and data to be processed by the CPU 10 or the like in a nonvolatile manner. For example, the nonvolatile memory 15 stores a control program 16 to be executed by the CPU 10, and OSD data 17 to be processed by the CPU 10 and the GPU 20. The nonvolatile memory 15 corresponds to an example of a nonvolatile storage section.

The control program 16 is a program for the CPU 10 to control each section of the projector 1, and constitutes an operation system of the projector 1.

Figure 2:
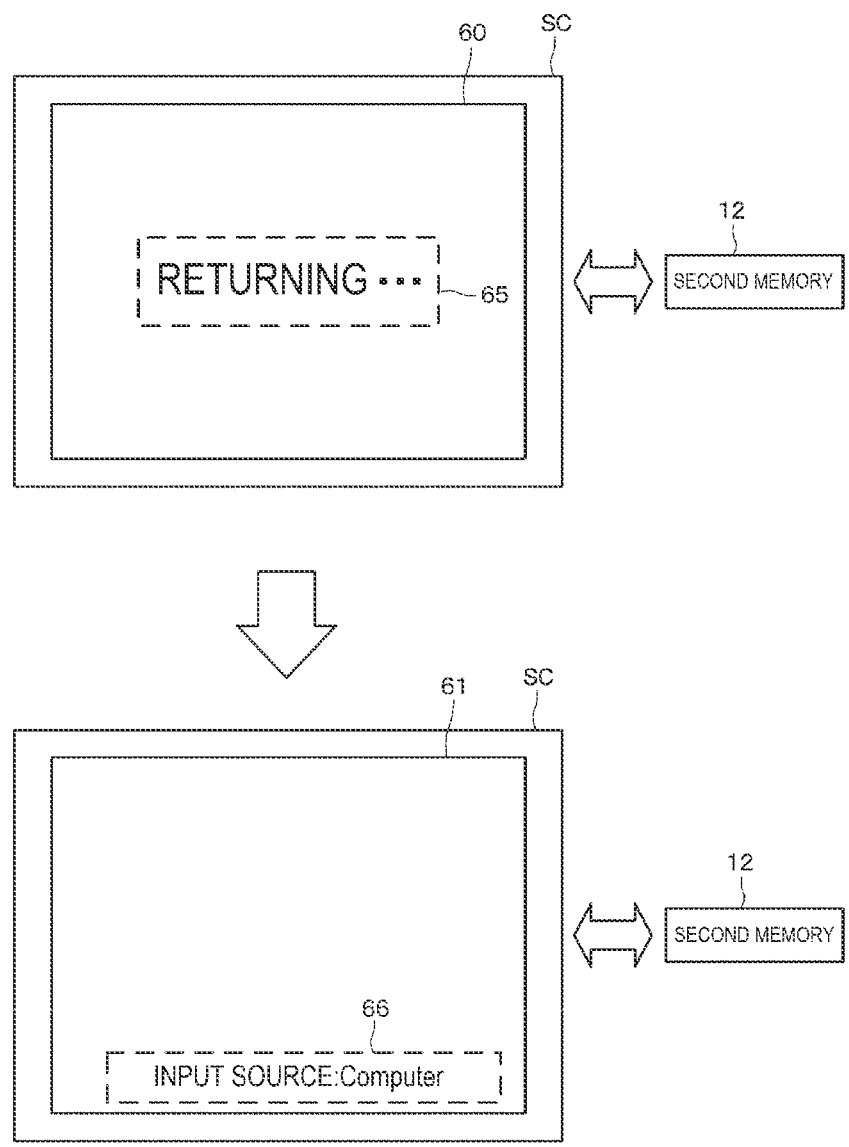
FIG. 2 is a diagram showing a display example when returning from the standby state.

The OSD data 17 is the data for the GPU 20 to display display objects 65, 66 shown in FIG. 2, and includes, for example, the image data of the display object 65 and the display data of the display object 66. These display objects 65, 66 are projected by a projection section 30 due to the GPU 20 executing an OSD processing function. The string of OSD is an abbreviation for On-Screen Display.

To the CPU 10, there is connected the GPU 20. The GPU 20 is an image processing device for processing the image data to be projected by the projector 1, and performs the processing of developing the image data in the frame memory provided to the first memory 11.

In the above description, the string of CPU is an abbreviation for Central Processing Unit, and the string of GPU is an abbreviation for Graphical Processing Unit. The CPU 10 and the GPU 20 can each be formed of a single processor, or can each be constituted by a plurality of processors. Further, the CPU 10 and the GPU 20 can each be formed of an SoC integrated with a peripheral circuit such as a memory, or can each be formed of an ASIC. It is possible to combine the CPU 10 and the GPU 20 with a DSP for executing predetermined arithmetic processing. Further, it is also possible to adopt a configuration in which a part of the CPU 10 and all or a part of the GPU 20 are implemented in the hardware, or it is also possible to configure a part of the CPU 10 and all or a part of the GPU 20 using a programmable device such as FPGA. The string of SoC is an abbreviation for System on Chip, and the string of DSP is an abbreviation for Digital Signal Processor. The string of ASIC is an abbreviation for Application Specific Integrated Circuit, and the string of FPGA is an abbreviation for Field-Programmable Gate Array. The string of DRAM is an abbreviation for Dynamic Random Access Memory. The string of ROM is an abbreviation for Read Only Memory. The string of EEPROM is an abbreviation for Electrically Erasable Programmable ROM.

The projector 1 is provided with a projection processing section 3 and the projection section 30 as a processing section for performing processing for projecting an image. The projection processing section 3 includes the GPU 20, a light source drive circuit 21, and a light modulation device drive section 22. The projection section 30 is provided with a light source 31, a light modulation device 32, and an optical unit 33. To the projection section 30, there are connected the light source drive circuit 21 and the light modulation device drive section 22 operating in accordance with the control by the CPU 10. The projection section 30 corresponds to an example of a display section.

The light source 31 is formed of a solid-state light source such as an LED or a laser source. The string of LED is an abbreviation for Light Emitting Diode. To the light source 31, there is connected the light source drive circuit 21. The light source drive circuit 21 supplies the light source 31 with power in accordance with the control by the CPU 10 to make the light source 31 emit light. The light source drive circuit 21 executes, for example, PWM control to adjust the luminance of the light source 31. The string of PWM is an abbreviation for Pulse Wave Modulation.

The light modulation device 32 modulates the light emitted by the light source 31 to generate the image light PL, and then irradiates the optical unit 33 with the image light PL. The light modulation device 32 is provided with a light modulation element such as a transmissive liquid crystal light valve, a reflective liquid crystal light valve, or a digital mirror device. The light modulation element of the light modulation device 32 is connected to the light modulation device drive section 22. The light modulation device drive section 22 drives the light modulation element of the light modulation device 32 to form the image frame by frame. It is also possible for the light modulation device 32 to be provided with a drive circuit for driving the light modulation element. For example, when the light modulation device 32 is formed of a liquid crystal light valve, it is also possible to provide a liquid crystal driver circuit as the drive circuit.

The GPU 20 obtains the image data to be projected by the projection section 30 in accordance with the control by the CPU 10 to develop the image forming one frame in the frame memory in the first memory 11. The GPU 20 executes image processing on the image developed in the first memory 11. The image processing to be executed by the GPU 20 includes, for example, a geometric correction process for compensating a keystone distortion of the projection image in the screen SC, an adjustment process including a luminance adjustment and corrections of the color tone of the projection image, and an OSD processing for combining the OSD image. It is also possible for the GPU 20 to execute image processing such as a resolution conversion process for adjusting the aspect ratio and the resolution of the image data in accordance with the light modulation device 32 or a frame rate conversion.

The GPU 20 outputs a display signal for displaying the image developed in the first memory 11 to the light modulation device 32 to drive the light modulation element of the light modulation device 32 to draw the image.

For example, in the OSD processing, the GPU 20 superimposes an image based on the OSD data 17 described above, an OSD menu image, or the like on a background image data set in advance or the image data input from the image source 48, and then makes the projection section 30 project the result. For example, defining the input data input from the image source 48 as a first layer, and the OSD menu image as a second layer, the superimposing process is performed by superimposing the first layer and the second layer on one other.

The optical unit 33 is provided with an optical element such as a lens, a mirror, or a prism, and projects the image light PL toward the screen SC. The optical unit 33 can be provided with an adjustment mechanism for moving the optical element to thereby adjust the zoom or the focus, or can also be a configuration in which the adjustment mechanism operates under the control by the CPU 10.

The projector 1 is provided with a sound processing section 23, a communication section 25, an interface 26, an operation reception section 27, and a power control section 28. The interface is hereinafter abbreviated as I/F.

The sound processing section 23 is connected to a microphone 41 and a speaker 42. The sound processing section 23 is provided with, for example, a conversion circuit for converting a vibration of the microphone 41 into a sound signal, and an A/D converter for converting an analog sound signal into a digital sound data. The sound processing section 23 collects the sound with the microphone 41 to generate the digital sound data, and then outputs the digital sound data to the CPU 10.

The sound processing section 23 has, for example, a D/A converter for generating the analog sound signal based on the digital sound data, and an amplifier for amplifying the analog sound signal. The sound processing section 23 outputs the sound signal to the speaker 42 in accordance with sound data and control data input from the CPU 10 to make the speaker 42 output the sound. The microphone 41 and the speaker 42 can be incorporated in the projector 1, or can also be installed outside the projector 1.

The communication section 25 is a communication module for performing data communication with equipment outside the projector 1 in accordance with the control by the CPU 10. The communication section 25 is provided with, for example, connectors to which communication cables compliant with a variety of standards such as Ethernet are connected, and a communication interface circuit for transmitting/receiving data via the communication cables. Further, the communication section 25 can be a wireless communication module for performing wireless communication with equipment outside the projector 1. Ethernet is a registered trademark.

The I/F 26 is an interface to which the image data is input. The I/F 26 is provided with, for example, a connector to which a transmission cable not shown is connected, and an interface circuit for receiving the image data via the transmission cable. To the I/F 26, there can be connected the image source 48 as a device for supplying the image data. As the image source 48, there can be used, for example, a PC, a tablet terminal, or a smartphone, or it is possible for the image source 48 to be a DVD player, a hard disk recorder, a television tuner system, a video game machine, or the like. The image data to be input to the I/F 26 can be moving image data or still image data, and any data format can be adopted. It is possible for the I/F 26 and the image source 48 to be connected to each other via a wireless communication line. In the present embodiment, there is shown an example in which the I/F 26 and the image source 48 are connected to each other with a cable. The type of the cable is not limited, but it is possible to a variety of types of cable such as a composite video cable, a USB cable, or an HDMI cable. The string of USB is an abbreviation for Universal Serial Bus. HDMI is a registered trademark, and an abbreviation for High Definition Multimedia Interface. The string of PC is an abbreviation for Personal Computer, the string of PDA is an abbreviation for Personal Digital Assistants, and the string of DVD is an abbreviation for digital versatile disk.

The communication section 25 and the I/F 26 correspond to an example of a connecting section.

The operation reception section 27 receives input to the projector 1. The operation reception section 27 is connected to a remote control light receiving section 45 for receiving an infrared signal transmitted by a remote controller not shown, and an operation panel 46 provided to a main body of the projector 1. The operation reception section 27 decodes the signal received by the remote control light receiving section 45 to detect an operation by the remote controller. The operation reception section 27 detects an operation on the operation panel 46. The operation reception section 27 outputs data representing the operation content to the CPU 10.

The I/F 26 has a function of detecting the fact that the image source 48 is newly connected, and a function of detecting the fact that the image data, the control data, or another signal is newly input from the image source 48. The I/F 26 generates an interrupt to the CPU 10 when, for example, connecting of the image source 48, or input of the data or a signal has been detected in the standby state of the projector 1.

The operation reception section 27 generates an interrupt to the CPU 10 when, for example, an operation by the remote control light receiving section 45 or the operation panel 46 has been detected in the standby state of the projector 1.

The power control section 28 supplies each section of the projector 1 with the power in accordance with the control by the CPU 10 based on the power supplied from the commercial AC power supply or an AC adapter not shown. The power control section 28 is provided with, for example, a converter for converting the commercial AC power into DC power, a voltage converter circuit, and a rectifier circuit. When the power is applied to the projector 1, the power control section 28 starts the power supply to each section of the projector 1. Further, the power control section 28 starts and stops the power supply to each section of the projector 1 in accordance with the control by the CPU 10.

2. Transition of Operation State of Projector

The operation state of the projector 1 makes the transition to a halt state in which the power is turned off, the transition to the standby state, and the transition to a normal operation state.

When the projector 1 has detected the operation of turning the power on with the operation reception section 27 in the halt state, the projector 1 starts the power supply to each section of the projector 1 with the power control section 28. Further, each section of the projector 1 is initialized due to the control by the CPU 10, and the transition to the normal operation state is made.

In the normal operation state, the power is supplied to each section of the projector 1, and the projection of the image by the projection section 30 is possible. In particular, the power is supplied to the CPU 10, the first memory 11, the second memory 12, the nonvolatile memory 15, the sound processing section 23, the communication section 25, the I/F 26, the operation reception section 27, the power control section 28, the projection processing section 3, and the projection section 30. Further, the power is supplied to the remote control light receiving section 45 and the operation panel 46 as needed so that the operation reception section 27 can detect the operation. Since the microphone 41 and the speaker 42 can operate in the normal operation state, the power is supplied to the microphone 41 and the speaker 42 as needed.

When the projection section 30 is not projecting the image in the normal operation state, the power is supplied to the projection processing section 3 and the projection section 30 by the power control section 28, and the light source 31 is put off due to the control by the light source drive circuit 21.

When the projector 1 has detected the operation of turning the power off with the operation reception section 27 in the normal operation state, the power control section 28 sequentially stops the power supply to each section of the projector 1 in accordance with the control by the CPU 10. Thus, the projector 1 makes the transition to the halt state.

When the transition condition of making the transition to the standby state is fulfilled in the normal operation state, the projector 1 makes the transition to the standby state.

The standby state is the state in which the projector 1 does not project an image to the screen SC, and in which the power supply to a part of the projector 1 is stopped. In particular, in the standby state, the power supply to the projection processing section 3 and the projection section 30 is stopped. Further, in the present embodiment, the power supply to the nonvolatile memory 15 and the sound processing section 23 is stopped in the standby state.

In the standby state, the power supply to each section included in a standby energization device 2 is continued. The standby energization device 2 includes at least the second memory 12 and the power control section 28. In the present embodiment, the standby energization device 2 further includes the communication section 25, the I/F 26, and the operation reception section 27. In the standby state, the operation reception section 27 keeps the state in which the operation by the remote control light receiving section 45 and the operation panel 46 can be detected. Therefore, the remote control light receiving section 45 and the operation panel 46 are supplied with the power as needed in the standby state, and can therefore be said to be included in the standby energization device 2 together with the operation reception section 27. The second memory 12 is energized also in the standby state. It is preferable that the storage capacity of the second memory 12 is as small as possible since the power consumption in the standby state can be suppressed. Therefore, for example, the storage capacity of the second memory 12 is small in capacity compared to the storage capacity of the first memory 11.

The communication section 25 can receive data from external equipment in the standby state. When the communication section 25 has received the data from the external equipment in the standby state, the communication section 25 generates an interrupt to the CPU 10. In the standby state, the communication section 25 can be set in a power saving state so that the power consumption of the communication section 25 becomes lower than in the normal operation state. It is possible for the communication section 25 to make, for example, the transmission period of packets or beacons for keeping the communication state through the communication cable longer in the power saving state than in the normal operation state. Further, for example, it is possible for the communication section 25 to make the period of trials of receiving the data or packets longer in the power saving state than in the normal operation state. Further, when the communication section 25 is the wireless communication module, it is possible to make the transmission output of the wireless signal lower in the power saving state than in the normal operation state.

The I/F 26 can detect the connection of the image source 48 and the input of the signal or the data from the image source 48 in the standby state. When the I/F 26 has detected the connection of the image source 48 or the input of the data or the like, the I/F 26 generates an interrupt to the CPU 10.

In the standby state, the I/F 26 can be set in a power saving state so that the power consumption of the I/F 26 becomes lower than in the normal operation state. For example, it is possible for the I/F 26 to make the period of determinations on presence or absence of the connection of the image source 48 longer in the power saving state than in the normal operation state. Further, for example, it is possible for the I/F 26 to make the period of determinations on presence or absence of the input of the signal or the data longer in the power saving state than in the normal operation state. Further, for example, it is possible for the I/F 26 to make the transmission period of the data transmitted/received to/from the image source 48 for checking the connection state longer in the power saving state than in the normal operation state.

The operation reception section 27 can detect the operation with the remote control light receiving section 45 and the operation panel 46 in the standby state as described above. When the operation reception section 27 has detected the operation, the operation reception section 27 generates an interrupt to the CPU 10. In the standby state, the operation reception section 27 can be set in a power saving state so that the power consumption of the operation reception section 27 becomes lower than in the normal operation state. For example, it is possible for the operation reception section 27 to make the period of detecting the infrared signal by the remote control light receiving section 45 longer in the power saving state than in the normal operation state. Further, for example, it is possible for the operation reception section 27 to make the period of determinations on presence or absence of the operation of the operation panel 46 longer in the power saving state than in the normal operation state.

In the standby state, the CPU 10 determines whether or not the return condition from the standby state to the normal operation state has been fulfilled. When the CPU 10 has determined that the return condition to the normal operation state has been fulfilled, the CPU 10 controls the power control section 28 to start the power supply to each section except the standby energization device 2. Further, the CPU 10 resets each section except the standby energization device 2 to make the transition of the whole of the projector 1 to the normal operation state.

The return condition is, for example, the generation of the interrupt from the communication section 25, the I/F 26, or the operation reception section 27. Further, for example, it is possible for the CPU 10 to have a timing function for timing the current time, and determine that the return condition has fulfilled when the time set in advance has been reached.

In the standby state, the CPU 10 can be set in a power saving state so that the power consumption of the CPU 10 becomes lower than in the normal operation state. It is possible for the CPU 10 to operate with, for example, the clock lower in frequency in the power saving state than in the normal operation state. This configuration can be realized by, for example, switching the frequency of the clock signal to be supplied from the clock signal supply circuit not shown to each section of the standby energization device 2 including the CPU 10 to a lower frequency.

The power control section 28 perform the power supply to each section of the standby energization device 2 in the standby state. The communication section 25, the I/F 26, and the operation reception section 27 are each supplied with the power necessary to continue the operation of generating the interrupt to the CPU 10. The CPU 10 is supplied with the power necessary to execute the function of determining whether or not the return condition is fulfilled.

The second memory 12 is the volatile memory as described above. Therefore, the power supply is necessary to keep the data stored by the second memory 12 in the state of being readable by the CPU 10. The power control section 28 supplies the second memory 12 with sufficient power to keep the data so that the data in the second memory 12 can also be kept in the standby state.

In contrast, the power supply to the first memory 11 is stopped in the standby state. The CPU 10 resets to stop the first memory 11 when making the transition from the normal operation state to the standby state. Therefore, the data stored by the first memory 11 in the normal operation state is lost in the process of making the transition to the standby state.

When the CPU 10 has determined that the return condition from the standby state to the normal operation state has been fulfilled, the CPU 10 starts the operation of the projection processing section 3 to start the projection by the projection section 30. Here, the GPU 20 displays a notice that the return from the standby state is in operation.

FIG. 2 is a diagram showing a display example when the projector 1 returns from the standby state, and shows an example of a returning screen 60 and a returning screen 61 to be displayed as the transition from the returning screen 60.

The returning screen 60 is a screen in which a display object 65 including characters for giving the notice that the processing of returning from the standby state is in operation is disposed. When displaying the returning screen 60, the GPU 20 obtains the OSD data 17 for displaying the display object 65. The GPU 20 develops the image data of the whole of the projection image in the frame memory based on the data of the background image set in advance, then combines the OSD data 17 with the image data in the frame memory in a superimposed manner to generate the data corresponding to one frame of the returning screen 60.

The OSD data 17 can be the image data of the display object 65, or can also be data for generating the image data of the display object 65. For example, the OSD data 17 can be the data obtained by compressing the image data of the display object 65, and it is possible for the GPU 20 to develop the OSD data 17 in the first memory 11, and then the image data thus developed is combined in the frame memory. Further, the OSD data 17 can be the data for generating the image data of the whole of the returning screen 60, but is assumed as the data of the display object 65 in the description of the present embodiment.

It is possible for the CPU 10 to make the projection processing section 3 display the returning screen 61 while executing the process of returning from the standby state. The returning screen 61 is a screen in which a display object 66 including characters for giving the notice of the type of the display source 48 connected to the projector 1 is disposed. For example, when the projector 1 is capable of projecting the image data input from a plurality of types of image sources 48, the display object 66 gives the notice of the type of the image source 48 currently selected. The display object 66 represents the type of the image source 48 which is inputting the image data to the projector 1, or the type of the image source 48 currently selected from the plurality of selectable image sources 48.

It is possible for the CPU 10 to project the returning screen 61 instead of the returning screen 60. For example, when the CPU 10 makes the transition from the standby state to the normal operation state in accordance with the interrupt from the I/F 26, it is possible to project the returning screen 61 representing information related to the image source 48 connected to the I/F 26. Further, it is possible for the CPU 10 to make the transition of the projection image from the returning screen 60 to the returning screen 61.

The OSD data 17 can be the image data of the display object 66, or can also be data for generating the image data of the display object 66. For example, the OSD data 17 can be data obtained by compressing the image data of the display object 66. Further, the OSD data 17 can be the data for generating the image data of the whole of the returning screen 61, but is assumed as the data of the display object 66 in the description of the present embodiment.

It is preferable for the CPU 10 to selectively use a plurality of types of display objects 66 in accordance with the type of the display source 48. Therefore, it is preferable for the CPU 10 to display the corresponding number of display objects 66 to the number of the types of the selectable image sources 48 in the projector 1 while switching between the display objects 66. In this case, the OSD data 17 includes the data of the plurality of display objects 66. Further, the OSD data 17 can be data including both of the data of the display object 65 and the data of the display object 66. Further, it is possible for the nonvolatile memory 15 to individually store the OSD data 17 including the data of the display object 65 and the OSD data 17 including the data of the display object 66.

When displaying the returning screen 60 or the returning screen 61, it is necessary for the GPU 20 to obtain the OSD data 17. In the data reading speed and the data writing speed, the nonvolatile memory 15 formed of the flash ROM or the EEPROM is remarkably lower compared to the first memory 11 and the second memory 12 formed of the DRAM or the like. Therefore, when the OSD data 17 is retrieved from the nonvolatile memory 15 before the GPU 20 displays the returning screen 60 or the returning screen 61, namely before the GPU 20 processes the OSD data 17, the processing of the GPU 20 obtaining the OSD data 17 can be made faster. The first memory 11 has a temporary storage area for temporarily storing data and a program in addition to the frame memory. For example, when the CPU 10 retrieves the OSD data 17 from the nonvolatile memory 15 and then stores the OSD data 17 in the temporary storage area of the first memory 11, it is possible for the GPU 20 to obtain the OSD data 17 in a short time.

However, when the projector 1 makes the transition to the standby state, the power supply to the first memory 11 is stopped, and thus, the first memory 11 is reset. Therefore, even when the OSD data 17 related to the display object 65 and the display object 66 to be displayed when returning from the standby state is stored in the first memory 11 in advance, the OSD data 17 thus stored in the first memory 11 cannot be used.

The projector 1 according to the present embodiment stores the OSD data 17 related to the display objects 65, 66 to be displayed when returning from the standby state in the second memory 12 in advance to thereby achieve the increase in speed of the processing of the GPU 20 obtaining the OSD data 17.

3. Operation of Projector

Figure 3:
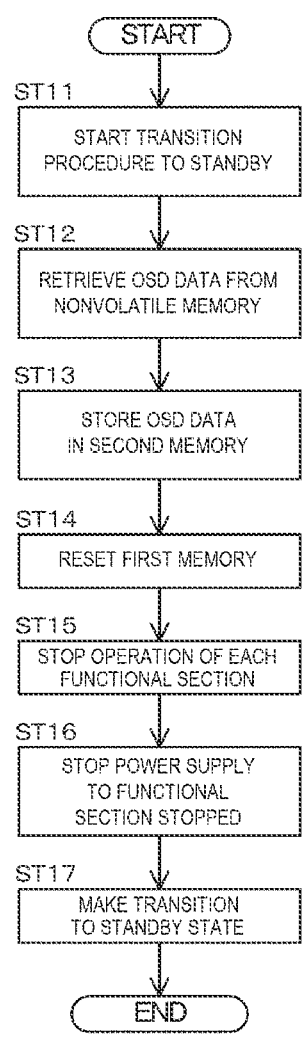
FIG. 3 is a flowchart showing an operation of the projector.
Figure 4:
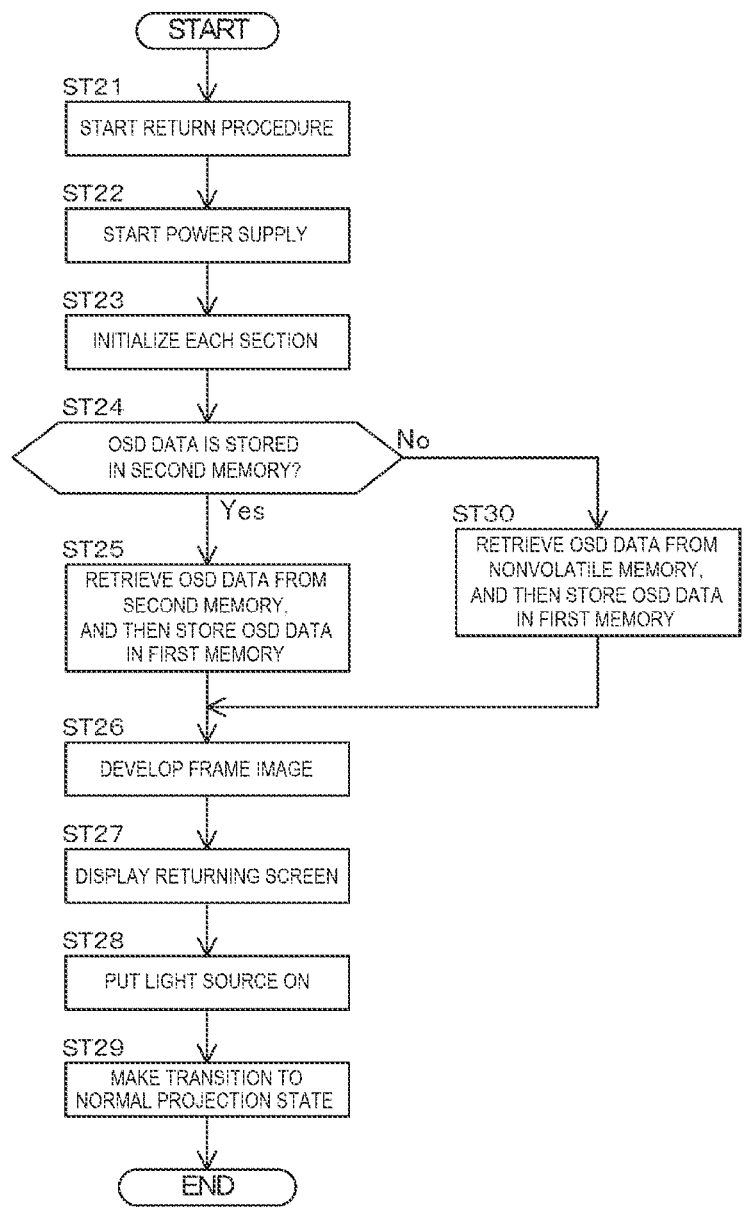
FIG. 4 is a flowchart showing an operation of the projector.

FIG. 3 and FIG. 4 are each a flowchart showing the operation of the projector. FIG. 3 shows the operation of making the transition of the projector 1 to the standby state, and FIG. 4 shows the operation of the projector 1 returning from the standby state to the normal operation state.

In the normal operation state, when the transition condition to the standby state is fulfilled, the CPU 10 starts (step ST11) a transition procedure to the standby state. As the transition condition, there can be cited, for example, the condition that the operation reception section 27 has detected the operationofinstructing the transition to the standby state, the condition that the state in which no input to the I/F 26 exists lasts for a predetermined period of time, and the condition that the state in which the image source 48 does not exist lasts for a predetermined period of time.

In the transition procedure, the CPU 10 retrieves (step ST12) the OSD data 17 from the nonvolatile memory 15, and then stores (step ST13) the OSD data 17 in the second memory 12. The CPU 10 resets (step ST14) the first memory 11, and then sequentially stops (step ST15) the operation of each section to which the power supply is stopped in the standby state. The CPU 10 controls the power control section 28 to stop (step ST16) the power supply to each section to be stopped in the standby state, and thus, the projector 1 makes (step ST17) the transition to the standby state.

It is preferable for the OSD data 17 to be the data related to the display of the display object 65 and the display object 66, for example, the image data of the display objects 65, 66 and the data obtained by compressing such image data. In this case, the data amount of the OSD data 17 is obviously smaller compared to the data of the whole of the returning screen 60 and the returning screen 61. Therefore, only a small storage area in the second memory 12 is required for storing the OSD data 17. Therefore, it is possible to suppress the capacity of the second memory 12 to be energized in the standby state, and it is possible to suppress the power consumption of the projector 1 in the standby state. Further, it is possible to execute the method of storing the OSD data 17 in the second memory 12 without taking a measure such as an increase in the capacity of the second memory 12.

In the standby state, when the return condition described above is fulfilled, the CPU 10 starts (step ST21 in FIG. 4) a return procedure from the standby state to the normal operation state.

The CPU 10 controls the power control section 28 to stop (step ST22) the power supply to each section to which the power supply has been stopped in the standby state, and then, initialize (step ST23) each section to which the power supply is resumed.

The CPU 10 determines (step ST24) whether or not the OSD data 17 is stored in the second memory 12. When the OSD data 17 is stored in the second memory 12 (YES in the step ST24), the CPU 10 retrieves the OSD data 17 from the second memory 12, and then stores (step ST25) the OSD data 17 in the first memory 11.

The GPU 20 develops (step ST26) the image of the returning screen 60 in the frame memory using the OSD data 17 stored in the first memory 11 in accordance with the control by the CPU 10. The GPU 20 makes (step ST27) the light modulation device 32 form the returning screen 60 developed in the frame memory. Here, the light source drive circuit 21 puts (step ST28) the light source 31 on in accordance with the control by the CPU 10, and the projector 1 makes (step ST29) the transition to the normal operation state. The processing in the step ST27 and the processing in the step ST28 can be executed in the reverse order, or can also be executed at the same time in parallel to each other.

In contrast, when the OSD data 17 is not stored in the second memory 12 (NO in the step ST24), the CPU 10 retrieves the OSD data 17 from the nonvolatile memory 15, and then stores (step ST30) the OSD data 17 in the first memory 11, and then makes the transition to the step ST26.

As described hereinabove, the projector 1 according to the embodiment implementing the present disclosure is the display device provided with the projection section 30 as the display section. The projector 1 is provided with the CPU 10 for controlling the projection section 30. The projector 1 is provided with the first memory 11 which is the volatile memory to be reset when the projector 1 makes the transition to the standby state, and the second memory 12 which is the volatile memory capable of keeping the data in the standby state of the projector 1. The CPU 10 stores the OSD data 17 in the second memory 12 when the projector 1 makes the transition to the standby state. The OSD data 17 includes the data of the object 65, the object 66, or the objects 65, 66 to be displayed by the projection section 30 when returning from the standby state to the normal operation state.

The method of controlling the projector 1 controls the storage of the data in the first memory 11 which is the volatile memory to be reset when the projector 1 makes the transition to the standby state, and the second memory 12 which is the volatile memory capable of keeping the data in the standby state of the projector 1. In this control method, the OSD data 17 is stored in the second memory 12 when the projector 1 makes the transition to the standby state.

According to the projector 1 implementing the display device and the method of controlling the display device according to the present disclosure, it is possible to retrieve the OSD data 17 from the second memory 12 and then project the returning screen 60, the returning screen 61, or the returning screens 60, 61 when returning from the standby state. Since the second memory 12 is the volatile memory capable of performing the data readout at high speed, it is possible to promptly project the returning screen 60, the returning screen 61, or the returning screens 60, 61 when returning from the standby state.

The CPU 10 retrieves the OSD data 17 stored in the second memory 12 and then makes the projection section 30 project the OSD data 17 when the projector 1 returns from the standby state to the normal operation state. Therefore, it is possible to promptly project the returning screen 60, the returning screen 61, or the returning screens 60, 61 when the projector 1 returns from the standby state to the normal operation state. For example, as shown in FIG. 2, it is possible to display the returning screen 60 by disposing the display object 65 based on the OSD data 17 stored in the second memory 12. The same applies to the returning screen 61.

In the standby state, the CPU 10, the second memory 12, and at least one of the communication section 25 and the I/F 26 to be connected to the external equipment can operate. In the standby state, the first memory 11 and the projection section 30 stop the operations, and in the normal operation state, the first memory 11, the nonvolatile memory 15, and the projection section 30 can operate. Therefore, when returning from the standby state in which the first memory 11, the nonvolatile memory 15, and the projection section 30 stop, it is possible to promptly project the returning screen 60, the returning screen 61, or the returning screens 60, 61 using the second memory 12.

The projector 1 is provided with the nonvolatile memory 15 for storing the OSD data 17. The CPU 10 retrieves the OSD data 17 from the nonvolatile memory 15, and then stores the OSD data 17 in the second memory 12 when the projector 1 makes the transition to the standby state. Therefore, it is possible to keep the OSD data 17 in a nonvolatile manner using the nonvolatile memory 15. When returning from the standby state, it is possible to promptly project the returning screen 60, the returning screen 61, or the returning screens 60, 61 using the second memory 12 from which the OSD data 17 can be retrieved at higher speed than from the nonvolatile memory 15.

The projector 1 is a projector provided with the projection section 30 for projecting the image light PL based on the light emitted by the light source 31 as the solid-state light source. In the standby state, the light source 31 stops the light emission, and when returning from the standby state to the normal operation state, the light source 31 starts the light emission, and the projection section 30 projects the image based on the data of the display objects 65, 66 retrieved from the second memory 12. According to this configuration, due to the characteristics of the solid-state light source, when the light source 31 is energized when retuning from the standby state to the normal operation state, the light source 31 promptly emits light at high luminance. Therefore, by the projection processing section 3 promptly generating the frame image, it is possible to project the returning screen 60, the returning screen 61, or the returning screens 60, 61 in an extremely short time when the return condition from the standby state has been fulfilled. Further, when it takes time for the projection processing section 3 to perform the processing of generating the data of the projection image, unmodulated light is projected to the screen SC. However, the projector 1 can avoid such a situation. Further, there is no need to perform control such as delaying the lighting of the light source 31 in order to prevent the unmodulated light from being projected to the screen SC.

4. Other Embodiments

The embodiment described above shows a specific example to which the present disclosure is applied, and the present disclosure is not limited to the embodiment.

For example, in the embodiment described above, there is presented the description illustrating the configuration in which the CPU 10 and the GPU 20 are connected to the first memory 11, but the present disclosure is not limited thereto. For example, it is possible to provide the frame memory separately from the first memory 11.

Further, specific specifications of the first memory 11, the second memory 12, and the nonvolatile memory 15 are arbitrary. For example, it is possible for the first memory 11 and the second memory 12 to use an SDRAM or a DDR SDRAM. The string of SDRAM is an abbreviation for Synchronous DRAM, and the string of DDR SDRAM is an abbreviation for Double-Data-Rate SDRAM.

Further, in the embodiment described above, there is described the example in which the CPU 10 stores the OSD data 17 in the second memory 12 in the step ST13 when making the transition from the normal operation state to the standby state. The present disclosure is not limited to this example, and for example, it is possible for the CPU 10 to store only the OSD data 17 related to the display object 65 to be displayed first when returning from the standby state to the normal operation state in the second memory 12 in the step ST13. In particular, when returning from the standby state to the normal operation state, the returning screen 60 is displayed, and then, it takes time for the GPU 20 to execute the processing of obtaining the display object 66 when subsequently displaying the returning screen 61, which does not pose a significant problem. In this case, the CPU 10 retrieves the OSD data 17 related to the display object 65 out of the OSD data 17 stored in the nonvolatile memory 15, and then stores the OSD data 17 related to the display object 65 in the second memory 12 in the step ST13. In the step ST26, the GPU 20 obtains the OSD data 17 related to the display object 65 to draw the image of the returning screen 60, and then makes the projection section 30 project the image of the returning screen 60 thus drawn. In this case, there is an advantage that only the small amount of data is required to be stored in the second memory 12. For example, it is possible to promptly project the returning screen 60 using the second memory 12 provided to the projector 1 in order to keep the operating system. Further, when the OSD data 17 includes the data related to both of the display object 65 and the display object 66, it is possible for the CPU 10 to extract a part of the OSD data 17 to store the result in the second memory 12 in the step ST13.

Further, in the embodiment described above, there is described the example in which the CPU 10 stores the OSD data 17 stored in the nonvolatile memory 15 in the second memory 12 in the step ST13 when the projector 1 makes the transition from the normal operation state to the standby state. The present disclosure is not limited to this example, but it is possible for the CPU 10 to, for example, retrieve the OSD data 17 which represents the OSD image developed in the first memory 11 in the superimposing process and located in the second layer from the first memory 11 and then store the OSD data 17 thus retrieved in the second memory 12 in the step ST13 when making the transition from the normal operation state to the standby state. Then, in the step ST26, the GPU 20 obtains the OSD data 17 in the second memory 12 to draw the image of the returning screen 60, and then makes the projection section 30 project the image of the returning screen 60 thus drawn when returning from the standby state to the normal operation state. In this case, there is an advantage that the OSD image which has been displayed in the normal operation state immediately before making the transition to the standby state can be displayed after returning from the standby state.

The operation states of the projector 1 are not limited to the three states, namely the halt state, the standby state, and the normal operation state. For example, it is possible to be able to execute an AV standby state in which the sound input/output by the sound processing section 23 is possible. The AV standby state is a state in which it is possible for the sound processing section 23 to perform the collection of the sound with the microphone 41, and the sound output with the speaker 42, and in which the projection by the projection section 30 is not performed. In the AV standby state, the power supply to at least the projection processing section 3 and the projection section 30 is stopped, and the power supply to the first memory 11 is also stopped. The AV standby state is used, for example, for the purpose of using the projector 1 as a loudspeaker by outputting the sound collected by the sound processing section 23 from the speaker 42, or for the purpose of outputting the data of the sound collected to the external equipment with the communication section 25. In this case, it is possible for the CPU 10 to execute the operation shown in FIG. 3 when making the transition from the normal operation state to the AV standby state similarly to the transition from the normal operation state to the standby state. Further, similarly to the operation shown in FIG. 4, it is possible to return to the normal operation state when the return condition has been fulfilled in the AV standby state. In other words, as long as the projector 1 can execute the state in which the power supply to the projection processing section 3 and the projection section 30 is stopped and the first memory 11 is stopped, and stores the OSD data 17 in the second memory 12 when making the transition to this state, it is possible to obtain the advantage derived from the present disclosure.

The display device according to the present disclosure is not limited to the projector 1, but it is also possible to adopt a liquid crystal monitor or a liquid crystal television set for displaying an image on a liquid crystal display panel as the display device. A display device provided with a plasma display panel or an organic EL display panel can also be used. In this case, the display panel corresponds to the display section in the present disclosure.

The specific mounting configuration of the functional sections shown in FIG. 1 is not limited to the configuration shown in FIG. 1, and it is not necessarily required to install the hardware individually corresponding to each of the functional sections. A part of the function realized by the software in the embodiment described above can also be realized by hardware, or a part of the function realized by the hardware can also be realized by software. Besides the above, the specific detailed configuration of each of other sections constituting the projector 1 can arbitrarily be modified within the scope or the spirit of the present disclosure.

What is claimed is:

1. A display device comprising:
   a display section;
   a processor configured to control the display section;
   a first memory which is a volatile memory to be reset when the display device makes a transition to a standby state; and
   a second memory which is a volatile memory configured to keep data in the standby state of the display device, wherein
   the processor stores data of a display object in the second memory in response to an occurrence of a transition condition, the occurrence of the transition condition causing the display device to make the transition to the standby state, and the data of the display object is displayed in the display section in response to an occurrence of a return condition, the occurrence of the return condition causing the display device to return from the standby state to a normal operation state.

2. The display device according to claim 1, wherein the processor retrieves the data of the display object stored in the second memory and then makes the display section display the data of the display object when the display device returns from the standby state to the normal operation state.

3. The display device according to claim 2, wherein
the processor, the second memory, and a connecting section to be connected to an external apparatus are configured to operate in the standby state while the first memory and the display section are configured to stop operating in the standby state, and
the first memory and the display section are configured to operate in the normal operation state.

4. The display device according to claim 1, further comprising:
a nonvolatile storage section configured to store the data of the display object, wherein
the processor retrieves the data of the display object from the nonvolatile storage section, and then stores the data of the display object in the second memory when the display device makes the transition to the standby state.

5. The display device according to claim 1, wherein
the display object includes an OSD image, and
the processor retrieves data of the OSD image from the first memory, and then stores the data of the OSD image in the second memory when the display device makes the transition to the standby state.

6. The display device according to claim 1, wherein
the display section is a projection section configured to project image light based on light emitted by a solid-state light source,
the solid-state light source is configured to stop emitting the light in the standby state, and
the solid-state light source is configured to start emitting the light, and the projection section is configured to project an image based on the data of the display object retrieved from the second memory when returning from the standby state to the normal operation state.

7. A method of controlling a display device equipped with a display section, the method comprising:
controlling storage of data in a first memory which is a volatile memory to be reset when the display device makes a transition to a standby state, and a second memory which is a volatile memory configured to keep data when the display device makes the transition to the standby state; and
storing data of a display object in the second memory in response to an occurrence of a transition condition, the occurrence of the transition condition causing the display device to make the transition to the standby state, wherein
the data of the display object is displayed in the display section in response to an occurrence of a return condition, the occurrence of the return condition causing the display device to return from the standby state to a normal operation state.

* * * * *